United States Patent [19]

El Sayed et al.

[11] Patent Number: 5,416,143

[45] Date of Patent: May 16, 1995

[54] HIGHLY FLAME-RETARDANT POLYAMIDE MOULDING COMPOUNDS

[75] Inventors: Aziz El Sayed, Leverkusen; Edgar Ostlinning, Düsseldorf; Karsten-Josef Idel; Dieter Freitag, both of Krefeld, all of Germany

[73] Assignee: Bayer Aktiengesellschaft, Leverkusen, Germany

[21] Appl. No.: 172,942

[22] Filed: Dec. 27, 1993

[30] Foreign Application Priority Data

Jan. 7, 1993 [DE] Germany .................. 43 00 261.7
Jan. 11, 1993 [DE] Germany .................. 43 00 451.2
Mar. 26, 1993 [DE] Germany .................. 43 09 965.3
Jul. 15, 1993 [DE] Germany .................. 43 23 676.6

[51] Int. Cl.⁶ .......................................... C08K 5/5313
[52] U.S. Cl. ................................ 524/116; 524/126; 524/262; 524/405; 524/413; 524/436; 528/158; 528/322; 528/331; 528/335
[58] Field of Search ............ 528/335, 322, 331, 158; 524/116, 126, 405, 436, 413, 262

[56] References Cited

U.S. PATENT DOCUMENTS

| | | | |
|---|---|---|---|
| 4,098,762 | 7/1978 | Miyata et al. | 260/45.7 R |
| 4,621,123 | 11/1986 | Takagishi et al. | 528/158 |
| 4,877,823 | 10/1989 | Plachetta et al. | 524/80 |
| 4,963,610 | 10/1990 | Schmid et al. | 524/436 |
| 5,021,488 | 6/1991 | Fuhr et al. | 524/116 |
| 5,081,222 | 1/1992 | Reimann et al. | 528/324 |
| 5,102,931 | 4/1992 | Fuhr et al. | 524/126 |
| 5,242,960 | 9/1993 | Ostlinning et al. | 524/126 |

*Primary Examiner*—Samuel A. Acquah
*Assistant Examiner*—P. Hampton-Hightower
*Attorney, Agent, or Firm*—Connolly and Hutz

[57] ABSTRACT

The invention relates to readily processible polyamide molding compounds which have very good mechanical and electrical properties as well as high surface quality and are based on polyamide, magnesium hydroxide and polyhydroxy compounds of the Novolak type.

4 Claims, No Drawings

HIGHLY FLAME-RETARDANT POLYAMIDE MOULDING COMPOUNDS

The invention relates to readily processible polyamide moulding compounds which have very good mechanical and electrical properties as well as high surface quality and are based on polyamide, magnesium hydroxide and polyhydroxy compounds of the Novolak type.

Polyamides are high-grade thermoplastics and are distinguished particularly by:
ease of processing,
very good mechanical properties,
very good electrical properties,
high heat resistance,
high resistance to chemicals and
very high surface quality.

The properties of polyamides can be greatly varied by the use of glass fibres, glass beads, mineral fillers or mixtures thereof as reinforcing materials. The addition of elastomers, for example, improves the impact strength of the reinforced polyamides. Due to the many possible combinations a very large number of products can be obtained with widely varying properties.

The surface quality can for example be negatively affected by the use of mineral fillers and/or glass fibres. Polyamides have also been successfully used for a long time in the electrical sector. Flameretardant polyamides are mainly used in this sector. The following flameretarding agents are known and have been used in polyamides for a long time:

Red Phosphorus

The addition of red phosphorus to polyamides is for example known from DE-A 3,713,746 A 1 (=U.S. Pat. No. 4,877,823) and EP-A 299 444 (=U.S. Pat. No. 5,081,222). It is mainly added to glass-fibre-reinforced PA 66 and 6/6T. Due to the natural red colour of phosphorus and its pigment-like properties such compounds (mixtures) can only be supplied in dark colours. Also they tend to form phosphine and phosphates under the effects of moisture and heat (due to the disproportionation of phosphorus). Phosphine has a corrosive effect, e.g. on the copper-containing contacts in electrical installations and equipment. Phosphates, on the other hand, form conductive deposits between electrical contacts. By using suitable stabilisers the disproportionation reaction of phosphorus can be inhibited, but is not prevented.

Organic Halogen Compounds

Brominated diphenyls or diphenyl ethers have been used for a long time in combination with antimony trioxide as additives for polyamides. The following halogen compounds are increasingly being used:
chlorinated cycloaliphatic hydrocarbons (Dechlorane ® plus from Occidental Chemical Co),
brominated styrene oligomers (e.g. in DE-A 2 703 419) and
ring-brominated polystyrenes (e.g. PYRO-CHEK 68 ® from FERRO Chemicals).

Zinc salts or iron oxides are also used as synergists for the abovementioned halogen compounds. Most halogen-based flame retardants begin to decompose at the processing temperatures of polyamides, corrrosive gases being thereby formed. This results for example in the destruction of the electrical contacts in switches and electrical installations. Also the electrical properties of the polyamides are impaired by the ionogenic cleavage products formed.

These disadvantages are however tolerated when manufacturing light-coloured articles.

Nitrogen Compounds

Of the nitrogen compounds melamine salts have proven to be particularly useful as flameretarding agents, although only for non-reinforced polyamides. Such products have a light natural colour and good electrical properties. The relatively low decomposition temperature of melamine salts is a disadvantage.

Magnesium Hydroxide

Magnesium hydroxide has been successfully used for a long time as a flame retardant for polyolefins and elastomers. Compared with aluminium hydroxide, the hydroxide additive previously used, it has the advantage of a higher dehydration temperature (>340° C.). The use of magnesium hydroxide in polyamides is known. A concentration of higher than 55% is however necessary to obtain a value of V O according to UL 94 (US fire test devised by Underwriter Laboratories) for a thickness of 1.6 mm. The processibility of such products is problematical. The mechanical properties of shaped articles produced therefrom fall to low levels. Also, surface quality is greatly reduced. EP-A 335 165 (=U.S. Pat. No. 4,963,610) proposes mixing polyamide with 0.1 to 20% by weight of a functionalised olefin homo- or copolymer and 3 to 30% by weight of a reinforcing fibre, in order to produce flame-retardant compounds using 40 to 70% by weight of special types of magnesium hydroxide (with a specific surface area of less than 18 m$^2$/g). A value of V 0 according to UL-94 for a thickness of 1.6 mm is not obtained with other magnesium hydroxides or without olefinic additives. Such compounds are not readily processible due to the coupling of the special polyolefins to the polyamide and the high quantities of fillers.

The invention is based on the object of producing phosphorus- and halogen-free, readily processible polyamide moulding compounds and shaped articles therefrom which do not have the known disadvantages and which have a classification of V O according to UL 94 for a thickness of 1.6 mm and also have good mechanical and electrical properties as well as high-quality surfaces.

It has now been found that the abovementioned properties can be obtained by combining a thermoplastic polyamide, 1 to 10% by weight of a polyhydroxy compound of the Novolak type with a degree of polymerisation of 3 to 20, reinforcing materials, an elastomer modifier, magnesium hydroxide, additives, lubricants, stabilisers and nucleating agents.

The invention relates to highly flame-retardant polyamide moulding compounds comprising
A) 35 to 55% by weight, preferably 40 to 53% by weight, of a thermoplastic, partially crystalline polyamide,
B) 1 to 10% by weight, preferably 3 to 6% by weight, of a polyhydroxy compound of the Novolak type having a degree of polymerisation of 3 to 20,
C) 0 to 30% by weight of reinforcing materials,
D) 0 to 15% by weight, preferably 0 to 10% by weight of an elastomer modifier,
E) 40 to 60% by weight, preferably 45 to 55% by weight of magnesium hydroxide and F) 0 to 2% by weight of processing additives,
the use of the polyamide moulding compounds for the production of shaped articles and shaped articles produced from the moulding compounds according to the invention.

The compounds according to the invention are produced in conventional single-screw or twin-screw extruders or compounders. The magnesium hydroxide is added to the polyamide melt through a granule hopper and/or a lateral screw. The reinforcing materials C) (e.g. glass fibres) are added by prior art methods via the glass fibre inlet shortly upstream of the die. The bulk temperature depends on the polyamides employed and is between 220° and 340° C.

Suitable thermoplastic polyamides A) in the moulding compounds according to the invention are partially crystalline polyamides (PA), and in particular PA 6, PA 66, PA 46, PA 610, PA 6/6T or partially crystalline copolyamides based on these components.

Suitable polyhydroxy compounds B) for the moulding compounds according to the invention are bisphenols or polyphenols, and preferably polycondensates of phenol or cresol with formaldehyde or bisphenols, as described in EP-A 423 564.

Sutiable reinforcing materials C) for the moulding compounds according to the invention are commercially available glass fibres and/or carbon fibres and/or mineral fibres, which are optionally surface-treated for polyamides, and preferably glass fibres.

Suitable elastomer modifiers D) according to the present invention are commercially available EP(D)M rubbers, acrylate rubbers or EVA copolymers with or without functional coupling groups.

Commerically available magnesium hydroxide with or without surface treatment is used as the magnesium hydroxide E) according to the invention. The mechanical properties are considerably improved by the treatment of the surface of the magnesium hydroxide with aminosilanes or epoxides. Finely divided (0.4 to 10 microns) Mg hydroxides with a bulk density of between 0.3 and 0.8 g/ml are preferably used according to the present invention.

Processing additives F) are commercially available lubricants, heat stabilisers and/or nucleating agents.

EXAMPLES

The following products were used in the examples:
PA 6=Durethan ® B 31 F from Bayer AG,
Vulkadur RB ®=Novolak from Bayer AG,
Magnesium hydroxide=Magnefin H10B ®, Securoc PA ®,
Glass fibres=Bayerglas CS 7919 ®,
Elastomer modifier=Exxelor VA 1801 ® or 1803 ® from Exxon, and
Amide wax=Abril wax ®.

Examples 1 to 10

The starting materials were partly premixed and extruded in a twin-screw compounder at a bulk temperature between 250° and 290° C. and then granulated. The granules obtained were dried in a vacuum drying cabinet for 4 hours at 70° C. and then injection moulded in an Arburg injection moulding machine at a bulk temperature of 290° C. to give test specimens.

The mechanical and electrical properties, the fire behaviour according to UL 94 and the surface quality were determined (see Tables 1 and 2).

TABLE 1

| | | Example 1 | 2 | 3 | 4 | 5 |
|---|---|---|---|---|---|---|
| | | Comparison | | | | |
| PA 6 | % | 44.9 | 42.9 | 35.9 | 34.6 | 29.4 |
| Mg hydroxide | % | 55.0 | 53.0 | 44.0 | 42.3 | 38.5 |
| Vulkadur RB | % | 0.0 | 4.0 | 0.0 | 3.0 | 2.0 |
| Glass fibre | % | 0.0 | 0.0 | 20.0 | 20.0 | 20.0 |
| Amide wax | % | 0.1 | 0.1 | 0.1 | 0.1 | 0.1 |
| Exxelor VA 1801 | % | 0.0 | 0.0 | 0.0 | 0.0 | 10.0 |
| | | Technical data | | | | |
| IZOD impact res. | KJ/m$^2$ | 25 | 24 | 34 | 30 | 40 |
| Flexural str. | MPa | 135 | 156 | 238 | 245 | 210 |
| Outer fibre strain | % | 2.0 | 1.9 | 2.1 | 2.0 | 2.1 |
| Flexural modulus | MPa | 8200 | 8700 | 13200 | 14000 | 12500 |
| Tensile strength | MPa | 78 | 87 | 147 | 1 57 | 140 |
| Elong. at break | % | 2.7 | 2.4 | 1.7 | 1.6 | 1.7 |
| Tensile modulus | MPa | 9000 | 10000 | 13000 | 13600 | 12900 |
| CTI | Volt | 600 | 600 | 600 | 600 | 600 |
| Glowwire | °C. | 960/1 mm | 960/1 mm | 960/1 mm | 960/1 mm | 960/1 mm |
| HDT B | °C. | >200 | >200 | >200 | >200 | >200 |
| UL 94 | | | | | | |
| 2.3 mm | class | V0 | V0 | V0 | V0 | V0 |
| 1.6 mm | class | V2 | V0 | V0 | V0 | V0 |
| 1.2 mm | class | V2 | V0 | V2 | V0 | V0 |
| Flow spiral at max. injection pressure 1150 bar | | | | | | |
| 276° C. | cm | 24 | 36 | 19 | 40 | 32 |
| 296° C. | cm | 35 | 68 | 38 | 66 | 51 |

TABLE 2

| | | Example 6 | 7 | 8 | 9 | 10 |
|---|---|---|---|---|---|---|
| | | Comparison | | | | |
| PA 66 | % | 44.9 | 42.9 | 35.9 | 34.6 | 29.4 |
| Mg hydroxide | % | 55.0 | 53.0 | 44.0 | 42.3 | 38.5 |
| Vulkadur RB | % | 0.0 | 4.0 | 0.0 | 3.0 | 2.0 |
| Glass fibre | % | 0.0 | 0.0 | 20.0 | 20.0 | 20.0 |
| Amide wax | % | 0.1 | 0.1 | 0.1 | 0.1 | 0.1 |
| Exxelor VA 1801 | % | 0.0 | 0.0 | 0.0 | 0.0 | 10.0 |
| | | Technical data | | | | |
| IZOD impact res. | KJ/m$^2$ | 20 | 19 | 25 | 24 | 32 |
| Flexural str. | MPa | 139 | 146 | 239 | 242 | 217 |
| Outer fibre strain | % | 1.8 | 1.7 | 1.7 | 1.6 | 2.0 |
| Flexural modulus | MPa | 8300 | 8900 | 13300 | 14500 | 12800 |
| Tensile strength | MPa | 83 | 89 | 154 | 159 | 146 |
| Elong. at break | % | 2.2 | 2.0 | 1.7 | 1.6 | 1.7 |
| Tensile modulus | MPa | 9300 | 10100 | 13000 | 13600 | 12900 |
| CTI | Volt | 600 | 600 | 600 | 600 | 600 |
| Glowwire | °C. | 960/1 mm | 960/1 mm | 960/1 mm | 960/1 mm | 960/1 mm |
| HDT B | °C. | >230 | >230 | >230 | >230 | >230 |
| UL 94 | | | | | | |
| 2.3 mm | class | V0 | V0 | V0 | V0 | V0 |
| 1.6 mm | class | V2 | V0 | V0 | V0 | V0 |
| 1.2 mm | class | V2 | V0 | V2 | V0 | V0 |

We claim:

1. Highly flame-retardant polyamide moulding compounds consisting of:
   A) 35 to 55% by weight of a thermoplastic, partially crystalline polyamide,
   B) 1 to 10% by weight of a polyhydroxy compound of the Novolak type with a degree of polymerisation of 3 to 20,
   C) 0 to 30% by weight of reinforcing materials,
   D) 0 to 15% by weight of an elastomer modifier,
   E) 40 to 60% by weight of magnesium hydroxide and
   F) 0 to 2% by weight of processing additives.

2. Moulding compounds according to claim 1, characterised in that they contain 10 to 30% by weight of reinforcing materials.

3. Moulding compounds according to claim 1, characterised in that they contain 4 to 10% by weight of an elastomer modifier.

4. Moulding compounds according to claim 1, characerised in that glass fibres, carbon fibres, mineral fibres or mixtures thereof are used as the reinforcing material C).

* * * * *